US006602966B1

(12) United States Patent
Vargas et al.

(10) Patent No.: US 6,602,966 B1
(45) Date of Patent: Aug. 5, 2003

(54) IN-REACTOR PROCESS FOR MAKING ETHYLENE POLYMER NANOCOMPOSITE MATERIALS

(75) Inventors: Edward S. Vargas, Loveland, OH (US); Michael W. Lynch, West Chester, OH (US); Michael J. Ruda, Seabrook, TX (US); Venki Chandrashekar, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/193,506

(22) Filed: Jul. 11, 2002

(51) Int. Cl.⁷ ................................................ C08F 2/44
(52) U.S. Cl. ......................... 526/64; 526/89; 526/217; 526/227; 526/319; 526/330; 526/352
(58) Field of Search .................. 526/227, 89, 352, 526/217, 64, 319, 330

(56) References Cited

U.S. PATENT DOCUMENTS

| 3,282,911 A | 11/1966 | Erchak, Jr. |
|---|---|---|
| 3,293,233 A | 12/1966 | Erchak, Jr. et al. |
| 4,169,927 A | * 10/1979 | Hill et al. .................... 526/124 |
| 4,473,672 A | 9/1984 | Bottrill |
| 5,412,001 A | 5/1995 | Fries |
| 5,412,025 A | 5/1995 | Fries |
| 5,422,386 A | 6/1995 | Fries et al. |
| 5,830,820 A | 11/1998 | Yano et al. |
| 5,906,955 A | 5/1999 | Hamura et al. |
| 5,925,587 A | 7/1999 | Lee et al. |
| 6,034,187 A | 3/2000 | Maehama et al. |
| 6,110,858 A | 8/2000 | Kaneko et al. |
| 6,252,020 B1 | 6/2001 | Kuo et al. |
| 2002/0156171 A1 | * 10/2002 | Drewniak et al. .......... 524/445 |

* cited by examiner

Primary Examiner—David W. Wu
Assistant Examiner—William Cheung
(74) Attorney, Agent, or Firm—Gerald A. Baracka; William A. Heidrich

(57) ABSTRACT

A process is provided for producing ethylene (co)polymer nanocomposites in a high pressure polymerization reactor. The process by which nanocomposites having organically modified clays incorporated and intimately dispersed therein involves polymerizing ethylene and one or more optional comonomers under high pressure polymerization conditions in the presence of an organic peroxide initiator and organically modified clay.

20 Claims, No Drawings

IN-REACTOR PROCESS FOR MAKING ETHYLENE POLYMER NANOCOMPOSITE MATERIALS

FIELD OF THE INVENTION

The invention relates to a method of producing nanocomposite materials by incorporating nanoclays during high pressure polymerizations. More specifically, the invention relates to a process wherein ethylene homopolymer or copolymer nanocomposites are produced by polymerizing the monomer(s) at high pressure in the presence of an organic peroxide initiator and an organically modified clay.

BACKGROUND OF THE INVENTION

Ethylene polymers and copolymers are widely used because of their desirable physical properties; however, the applications for these polymers could be extended if certain properties, such as melt strength and stress crack resistance, could be improved. While conventional fillers can be employed to improve certain physical properties, it is often at the expense of other properties.

In recent years, nanoclays, i.e., organically modified clays, have been extensively used to enhance the performance of olefin polymers and overcome the problems heretofore observed when conventional fillers such as talc and calcium carbonate. The nanoclays have improved dispersibility in the polymer matrix due to their plate-like structure. As a result, the size of the filler particle, when dispersed, is on a nanoscale so that property enhancement is achieved at much lower filler levels compared to traditional fillers. Separation of the clay platelettes occurs in two steps. The first step is to separate the platelettes just enough to allow the polymer to locate between the plates and to maintain the spacing. This is known as intercalation. The second step is to delaminate or separate the platelettes further, which typically is achieved by melt mixing in an extruder or the like. This is called exfoliation. The extent of property improvement is typically related to the extent of exfoliation.

Various processes to produce in-reactor-filled polyolefin composite materials are known. U.S. Pat. Nos. 5,412,001; 5,412,025 and 5,422,386 describe processes for reactor-filling polyolefins by polymerizing α-olefins in the presence of conventional fillers, such as Kaolin, mica or talc, which have been pretreated with catalytic amounts of organometallic compounds such as transition metal ester compounds.

U.S. Pat. Nos. 5,830,820; 5,906,955; 5,925,587; 6,034,187 and 6,110,858 disclose supported catalysts for the polymerization of olefins. Low levels of these supported catalysts are then used to catalyze the polymerization of olefins and provide polyolefins containing low levels of filler material.

U.S. Pat. No. 4,473,672 describes a process for making polyolefin compositions with a variety of fillers such as graphite, carbon black, aluminosilicate clay, mica, talc, vermiculite or glass fibers by pretreating the filler with an organic magnesium compound and then adding the resultant composition to a transition metal and subsequently initiating the polymerization with an organoaluminum compound.

U.S. Pat. No. 6,252,020 discloses clay-filled compositions produced by bulk and suspension polymerization of vinyl monomers, such as styrene, in the presence of clay and catalysts such as peroxides. The polymerization of olefins such as ethylene or propylene is not described or suggested.

There is a need for improved methods of dispersing clay fillers into ethylene homopolymers and copolymers utilizing in-reactor-filling procedures.

SUMMARY OF THE INVENTION

The present invention relates to a high pressure process for producing ethylene homopolymers and copolymers having organically modified clays incorporated and intimately dispersed therein. The process involves producing ethylene (co)polymer nanocomposites by (co)polymerizing ethylene under high pressure polymerization conditions in the presence of an organic peroxide initiator and organically modified smectite clay. Intercalation and exfoliation of the clay is effected in this manner. For the process the organically modified clay can be added to the high pressure polymerization reactor by one of several methods which can include the use of polar solvents, polar monomers or incorporation of the organic peroxide initiator on the clay. The latter procedure involves pretreating the organically modified clay with the organic peroxide. Polymerization can be accomplished utilizing autoclave or tubular reactors operated at pressures from about 10000 to 50000 psi and temperatures from about 250 to 650° F.

Organically modified clays preferably used for the process are montmorillonite clays that have been ion exchanged and intercalated with a quaternary ammonium ion corresponding to the formula $$(R)(R_1)(R_2)(R_3)N^+$$

where R represents a $C_{18}$ alkyl substituent or mixture of alkyl substituents wherein the $C_{18}$ alkyl moieties constitute 50% or more of the mixture and $R_1$, $R_2$ and $R_3$ are independently selected from the group consisting of R, H and $C_{1-22}$ hydrocarbon groups.

For the production of ethylene copolymers the comonomers are preferably olefinically unsaturated comonomers selected from the group consisting of $C_{3-8}$ α-olefins, vinyl $C_{2-4}$ carboxylate and $C_{1-4}$ alkyl (meth)acrylates.

DETAILED DESCRIPTION OF THE INVENTION

Clays useful for the invention are smectite clays which are well described in the literature (see Izumi, Y., et al., *Zeolite, Clay and Heteropoly Acid in Organic Reactions*, VCH Publishers Inc. (1992)). They are layered materials with exchangeable cations between the layers to compensate for the negative charge of the layers. Clays are classified according to their layer charge. Smectite clay minerals have cation exchange capacity in the range of 50–100 meq/100 g-clay.

Smectite clays can be synthesized from magnesium silicates or, more commonly, they are obtained from naturally occurring bentonite ore. Two common types of smectite clay are montmorillonite and hectorite. Montmorillonite is classified as magnesium aluminum silicate and hectorite as magnesium silicate.

The cations on the clay surface affect the organophilicity of the clay. If the cation is a metallic cation such as sodium or calcium, the clay is not very organophilic. If the cation is an organic cation, such as an ammonium cation, then the clay becomes more organophilic. These latter types of organically modified clays are readily prepared by cation exchange of the sodium clay with an organic cation. Suitable organic cations include ammonium cations where the nitrogen has four non-hydrogen substituents, such as hexadecyloctadecyldimethyl ammonium, dimethyldioctadecyl ammonium, benzyl triethyl ammonium, methyltrioctylammonium and poly(oxypropylene)methyldiethyl ammonium. Organically modified clays of the above types, also referred to herein as organoclays or nanoclays, are employed for the process of the present invention.

For the process of the invention, smectite clays of the above types, and particularly montmorillonite clays, reacted with ammonium compounds having one or more $C_{18}$ alkyl substituents are most advantageously employed. Montmorillonite clays that have been ion exchanged and intercalated with quaternary ammonium ions corresponding to the formula

where R represents a $C_{18}$ alkyl substituent or mixture of alkyl substituents wherein the $C_{18}$ alkyl moieties constitute 50% or more of the mixture and $R_1$, $R_2$ and $R_3$ are independently selected from the group consisting of R, H or a $C_{1-22}$ hydrocarbon group are particularly useful. Mixed alkyl substituents of the above types are typically obtained utilizing amines derived from natural sources such as beef tallow or mutton tallow. R moieties obtained from such natural products correspond to the constituent fatty acids and typically are mixtures of aliphatic radicals comprised of predominantly $C_{14-18}$ carbon atoms. The carbon number range and distribution within the carbon number range, i.e., percentage of each component, can vary depending on factors such as the tallow source, treatment and age of the tallow. Typical constituent fatty acid values have, however, been generated and are as follows:

| Constituent Fatty Acid | Beef Tallow | Mutton Tallow |
| --- | --- | --- |
| Myristic ($C_{14}$) | 6.3% | 4.6% |
| Palinitic ($C_{16}$) | 27.4% | 24.6% |
| Stearic ($C_{18}$) | 14.1% | 31.5% |
| Oleic ($C_{18:1}$) | 49.6% | 36.0% |
| Linoleic ($C_{18:2}$) | 2.5% | 4.3% |

Source: *CRC Handbook of Chemistry and Physics*, 74th ed. (1993–94), pages 7–29. Thus, when hydrogenated and even allowing for the variations in tallow composition referred to above, it is expected that the $C_{18}$ alkyl substituents will comprise at least 60% by weight and, more typically, at least 65% by weight of the R groups. More specifically, it is anticipated R would be comprised of approximately 5% $C_{14}$, 30% $C_{16}$, and 65% $C_{18}$ alkyl groups.

Montmorillonite clays modified with dimethyl dihydrogenated tallow ammonium ion (abbreviated 2M2HT) and represented by the formula:

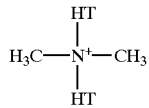

where HT represents the hydrogenated tallow group are highly effective. Montmorillonite clays modified with dimethyl dihydrogenated tallow ammonium ion at a modifier concentration of 50 to 150 meq/100 g are highly advantageous. Modified clays of this type are available from commercial sources. For example, Southern Clay Products, Inc., offers three montmorillonite clay products modified to different levels with dimethyl dihydrogenated tallow ammonium chloride, namely, Cloisite® 6A with a modifier concentration of 140 meq/100 g, Cloisite® 15A with a modifier concentration of 125 meq/100 g and Cloisite® 20A with a modifier concentration of 95 meq/100 g.

High pressure processes for the polymerization of ethylene are known and any of these known processes can be utilized for the invention. One such process is the so-called autoclave process—details of which are provided in U.S. Pat. No. 3,756,996 and which is incorporated herein by reference. Autoclave processes generally utilize elongated vertically disposed reactors having cylindrical interior reaction chambers having a length-to-diameter ratio of at least 2.5:1 or higher. These reactors have multiple reaction zones with means provided in each zone for the addition of monomer and/or initiator. Means for maintaining each of the reaction zones at the same or, more typically, different temperatures is also provided. Agitation is employed within the reactor by providing an agitator shaft extending through the axis of the reactor for its entire length with suitably configured and numbered blades to move the reaction mixture upwardly through the annular portion of the reaction chamber near the agitator shaft and downwardly along a portion of the reaction chamber near the side walls. In this way the desired radial and/or end-to-end mixing can be achieved. The agitator can be driven by an internally or externally located motor. Peroxide initiator can be added either in the monomer feed line to the reactor and/or at any of the various reaction zones. The nanoclay can be injected at various reactor locations. The injection point may lead to process or product optimization.

Pressures within the autoclave reactor will typically be maintained from about 10000 to 50000 psi. Temperatures varying longitudinally within the reaction chamber zones can range from about 250° F. to 650° F.

To achieve in-reactor incorporation and intimate dispersion of the organically modified clay in accordance with the process of the invention, the organically modified clay is introduced to and present in the autoclave reactor during the polymerization. Introduction of the organically modified clay may be accomplished using any of several procedures or a combination of these techniques can be employed. The manner and mode of nanoclay addition is dependent on a variety of factors but primarily is a function of whether the organically modified clay is pretreated with peroxide initiator and/or combined with a polar solvent and/or polar comonomer.

For example, the organically modified clay may be combined with a polar solvent, such as toluene, capable of exfoliating the clay and this mixture fed to the reactor through the feed line or it can be introduced into the first, second or last reactor zones depending on the desired effect and molecular weight of the polymer produced. The nanoclay may be first blended with the polar solvent capable of exfoliation and then the exfoliated mixture further blended with a carrier solvent, such as mineral spirits, for introduction to one or multiple reactor locations. Peroxide initiator may also be added to the above-described nanoclay/solvent mixtures. Typically if an organic peroxide is included, the mixture is introduced during the early stages of the polymerization.

In those situations where ethylene is to be copolymerized with polar comonomers, such as vinyl acetate, the organically modified clay may be combined with the comonomer and this mixture fed to the autoclave reactor at one or multiple locations. The polar comonomer serves as a diluent and exfoliant for the clay and further disperse it as polymerization occurs with monomer present in the layers of the clay. Other diluents, such as mineral spirits or the like, may also be included with the organically modified clay/polar comonomer mixture to facilitate handling and introduction to the reactor.

In an especially useful embodiment of the invention which can be used for both homo- and copolymerizations, the organically modified clay may be impregnated with the organic peroxide initiator by a slurry or incipient wetness technique and fed to one or more reactor locations. All or only a portion of the organic peroxide initiator required to maintain polymerization may be added in this manner. In most instances, the peroxide impregnated nanoclay will be combined with mineral spirits, toluene or xylene to facilitate introduction to the autoclave.

An amount of organoclay having organic peroxide deposited thereon is introduced to the autoclave reactor. This serves to initiate the polymerization. The amount will be such that the resulting filled ethylene polymer will have from about 0.25 to 12 weight percent clay and, more preferably, 1 to 10 weight percent intimately dispersed therein. The peroxide pretreated nanoclay may be introduced at one or more zones in the reactor; however, most effective initiation and dispersion will be achieved when at least a substantial portion of the peroxide pretreated clay is present in the first reaction zone. Introducing the pretreated clay to the early stages of the reactor enables maximum diffusion of ethylene into the spacings between the clay platelettes which can optimize polymerization on the clay surface and thus provide highly effective intercalation and exfoliation as high levels of polymer are produced. Also, if additional initiator is required to maintain polymerization, either neat organic peroxide or organoclay which has been precontacted with the same or different organic peroxide can be introduced into one or more of the reactor zones.

Organic peroxides can be any of those known to be useful initiators for high pressure polymerization processes. Representative organic peroxides include, for example: 2,4-dichlorobenzoyl peroxide, caprylyl peroxide, lauroyl peroxide, tert-butylperoxyisobutyrate, benzoyl peroxide, para-chlorobenzoyl peroxide, di-tert-butyl diperphthalate, tert-butyl peroxyacetate, tert-butyl peroxybenzoate, dicumyl peroxide, tert-butyl hydroperoxide, methyl ethyl ketone peroxide, di-tert-butyl peroxide, tert-butyl peroxyacetate, tert-amyl peroxyacetate, tert-butyl peroxypivalate, tert-amyl peroxypionalate, tert-butyl peroxymeodecanoate, tert-butyl peroctoate, di-sec-butyl peroxydicarbonate, di-(3,5,5-trimethylhexanoyl)peroxide, paramenthane hydroperoxide, pinene hydroperoxide, cumene hydroperoxide, 2,5-dimethylhexane-2,5-dihydroperoxide, and mixtures thereof.

Pretreatment, i.e., impregnation, of the organoclay with the organic peroxide can be accomplished by slurrying wherein the peroxide and modified clay are contacted in a suitable hydrocarbon medium and the hydrocarbon then evaporated. evaporating the hydrocarbon. If the peroxide is a solid, the hydrocarbon is preferably one in which the peroxide is soluble or can be easily dispersed. Suitable hydrocarbons can include aliphatic solvents, such as hexane and heptane; aromatic solvents such as benzene; alkyl-substituted benzenes such as toluene and xylene; halogenated benzenes such as dichloro- or trichlorobenzene; and the like. Pretreatment may also be accomplished using an incipient wetness procedure wherein a controlled amount of the organic peroxide with a suitable hydrocarbon is added in a controlled manner to the organically modified clay and thereafter subjected to drying which is carried out at a controlled temperature at or below the boiling point of the hydrocarbon to a point of incipient wetness. Such procedures are well known to those skilled in the art.

The amount of organic peroxide deposited on the nanoclay can vary but will generally be from about 0.01 to about 10 weight percent. A more preferred range would be 0.1 to 5 weight percent. If desired or required for the process, additional organic peroxide which is not deposited on the organoclay, may also be introduced during the course of the polymerization process. This additional peroxide may be dispersed/dissolved in a hydrocarbon solvent such as isobutane, cyclohexane, mineral spirits or the like.

Conventional procedures can be employed to recover the nanocomposite at the conclusion of the polymerization. The nanocomposite material having the organically modified clay intimately dispersed therein is removed from the end of the reactor through a suitable conduit with a pressure control value. At these very high pressures, the temperature of ethylene rises as the pressure is reduced. Therefore, the presence of unpolymerized ethylene will cause a temperature rise as the gas-polymer mixture exits the reactor through the pressure control valve. Post-reactor cooling is therefore applied after the pressure control value. After separation and removal of unreacted ethylene and any other unreacted comonomers, the resin is sent to the finishing operation where it is extruded into pellets and stored. At the finishing operation, various additives can be added. Any clay not incorporated in the polymer can be removed from recycled gas streams by the use of suitable filters.

Another common high pressure process which can be used for the invention is the so-called tubular process. Tubular processes for the polymerization of ethylene homopolymers and copolymers are known. One such process is described in U.S. Pat. No. 3,282,911 which is incorporated herein by reference. Operation of tubular reactors is similar to that described for autoclave reactors. For example, tubular reactors typically have several zones where initiator and/or fresh or recycled ethylene are introduced. Each zone can be run at a different temperature thus enabling direct control of the mix of molecular species. High gas velocities are employed to minimize tube wall fouling. By utilizing an oscillating pressure control valve, periodic pressure pulse and gas velocity changes within the tube can be produced to sweep polymer from the reactor walls and reduce the fouling tendency.

The process of the invention can be utilized for the polymerization of ethylene, alone or in combination with one or more olefinically unsaturated comonomers, at high pressure utilizing an organic peroxide initiator. It is particularly useful for the preparation of low density polyethylene (LDPE) nanocomposites and ethylene copolymer, e.g., ethylene-vinyl acetate (EVA), nanocomposites. Copolymers will typically have ethylene as the major constituent.

Most ethylene homopolymer nanocomposites made by high pressure, peroxide initiated processes will fall in the density range 0.915 $g/cm^3$ to 0.0.965 $g/cm^3$ and, more generally, 0.915 to 0.955 $g/cm^3$. Polyethylene homopolymers produced by high pressure processes generally have 0.1 to 5 branches per hundred carbon atoms and crystallinities varying from about 35 to 75 percent.

Olefinically unsaturated comonomers which can be copolymerized with the ethylene include $\alpha$-olefins, such as propylene, butene-1, hexene-1, and octene-1; vinyl carboxylates such as vinyl acetate and vinyl propionate; alkyl acrylates and methacrylates such as methyl acrylate, ethyl acrylate, methyl methacrylate, and n-butyl acrylate; vinyl silanes, such as vinyltrimethoxysilane and vinyltriethoxysilane; acrylic and methacrylic acids; and carbon monoxide. Vinyl carboxylates and alkyl (meth)acrylate comonomers are particularly useful polar comonomers for the process of the invention. Of these vinyl acetate, ethyl acrylate and n-butyl acrylate are especially useful polar comonomers.

Useful copolymers produced using high pressure processes are typically comprised of ethylene, as the major component, with $C_{3-8}$ $\alpha$-olefin, vinyl $C_{2-4}$ carboxylate or $C_{1-4}$ alkyl (meth)acrylate comonomers present in minor amounts. Comonomer contents of ethylene-$C_{3-8}$ α-olefin copolymers will generally range from 0.1 to 25 weight percent and, more preferably, from 0.5 to 15 weight percent.

Ethylene-vinyl acetate (EVA) copolymers are preferred ethylene-vinyl carboxylate polymers which can be produced and ethylene-ethyl acrylate (EEA) and ethylene-n-butyl acrylate (ENBA) copolymers are preferred ethylene-alkyl acrylate copolymers. Vinyl acetate contents of EVA copolymers will typically range from 2 to 48 weight percent and, more preferably, from 4 to 45 weight percent. Acrylate monomer contents for the EEA and ENBA copolymers are typically from 1 to 48 weight percent and, more preferably, from 2.5 to 45 weight percent.

The following examples merely illustrate the invention. Those skilled in the art will recognize many variations that are within the spirit of the invention and the scope of the claims.

EXAMPLE 1

A polyethylene nanocomposite suitable for film grade resin applications is prepared using a conventional stirred autoclave reactor utilized for continuous commercial production of LDPE homopolymers at operating pressures and temperatures from 16000 to 30000 psig and 280 to 600° F., respectively. The reactor has four reaction zones. The various zones are maintained within the following temperature ranges: $1^{st}$ zone 300–380° F.; $2^{nd}$ zone 370–440° F.; $3^{rd}$ zone 430–510° F.; and $4^{th}$ zone 500–600° F. Ethylene monomer is fed into the $1^{st}$ reactor zone. Organic peroxide initiator is fed into all of the reaction zones. Organically modified clay pretreated with organic peroxide is fed into the $1^{st}$ reaction zone. Total feed to the reaction is at a rate of 44000 pounds per hour.

Organic peroxides charged to the various reaction zones are selected based on their decomposition temperatures at the operating temperature in that particular zone. Tert-butyl peroxypivalate is fed to the $1^{st}$ zone. The peroxide is deposited on Cloisite 15A, a montmorillonite clay modified with 2M2HT at a modifier concentration of 125 meq/100 g, by combining the peroxide and nanoclay in heptane and then evaporating the solvent. The organically modified clay having about 1 weight percent t-butyl peroxypivalate deposited thereon is combined with odorless mineral spirits (OMS) for injection into the first reaction zone. Tert-butyl peroxy 2-ethylhexanoate, t-butyl peroxyacetate and di-t-butyl peroxide are respectively charged to the $2^{nd}$, $3^{rd}$ and $4^{th}$ reaction zones. In all instances, the peroxide is fed to the reactor with a hydrocarbon diluent (OMS). Individual peroxide feed rates are adjusted to maintain/control the polymerization rate throughout the reactor. Total peroxide feed to the reactor is approximately 300 ppm based on the total reactor feed.

Employing the above-identified reaction conditions is expected to produce an ethylene homopolymer nanocomposite having about 5% organically modified clay incorporated and intimately dispersed therein and having a density of about 0.945 g/cm³. The nanocomposite resin powder obtained from the reactor is subjected to a conventional finishing operation where suitable additives typically added to film grade resins, e.g., stabilizers, slip agents, antiblocking agents, etc., are incorporated and the resin pelletized.

EXAMPLE 2

Following the same general procedure as described in Example 1, except for the changes noted below, an ethylene-vinyl acetate nanocomposite is produced in a high pressure autoclave reactor. For this polymerization, temperature ranges in the four reaction zones are: $1^{st}$ zone 280–340° F.; $2^{nd}$ zone 330–380° F.; $3^{rd}$ zone 370–440° F.; $4^{th}$ zone 430–510° F. Peroxides fed into the respective zones are t-butyl peroxyneodecanoate, t-butyl peroxypivalate, t-butyl peroxy 2-ethylhexanoate and t-butyl peroxyacetate. All peroxides were combined with a hydrocarbon diluent for injection into the reactor. Total peroxide fed to the reactor is 200 ppm. The organically modified clay is fed to all zones of the reactor with vinyl acetate comonomer as the diluent. The amount of nanoclay fed to the reactor is calculated to produce a concentration of 6 percent nanoclay in the resulting nanocomposite. Vinyl acetate is also fed to the reactor with the ethylene feed stream. Total vinyl acetate fed at the various locations is controlled to produce copolymers having approximately 10% copolymerized vinyl acetate.

Nanocomposites produced in accordance with the process of the invention may be advantageously used for a variety of applications including thermoforming, blow molding, extrusion coating and foamed and sheet extrusion. By using the nanocomposites it is possible to eliminate or reduce problems heretofore associated with certain olefin polymer base resins. For example, increased melt strength can be obtained with nanocomposites. This can be highly advantageous when blow molding larger parts. Also, in thick (0.25–1.5 inch) sheet extrusion processes where resins have a tendency to sag as they exit the die and before they contact the chill roll, use of nanocomposites can eliminate or at least significantly reduce sagging and any operational problems associated therewith. Similar advantages can be realized when nanocomposites produced in accordance with the present process are utilized for film applications and in thermoforming and extrusion coating processes.

We claim:

1. A process to produce ethylene (co)polymer nanocomposites comprising (co)polymerizing ethylene under high pressure polymerization conditions in the presence of organic peroxide initiator and organically modified smectite clay.

2. The process of claim 1 wherein the organically modified clay is a montmorillonite clay that has been ion exchanged and intercalated with a quaternary ammonium ion corresponding to the formula

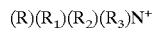

$(R)(R_1)(R_2)(R_3)N^+$ where R represents a $C_{18}$ alkyl substituent or mixture of alkyl substituents wherein the $C_{18}$ alkyl moieties constitute 50% or more of the mixture and $R_1$, $R_2$ and $R_3$ are independently selected from the group consisting of R, H and $C_{1-22}$ hydrocarbon groups.

3. The process of claim 2 wherein the organically modified clay is a montmorillonite clay modified with dimethyl dihydrogenated tallow ammonium ion at a modifier concentration of 50 to 150 meq/100 g.

4. The process of claim 1 wherein the polymerization is carried out at a pressure from about 10000 to 50000 psi and temperature from about 250 to 650° F.

5. The process of claim 4 wherein the polymerization is conducted in an autoclave reactor.

6. The process of claim 4 wherein the polymerization is conducted in a tubular reactor.

7. The process of claim 1 wherein the ethylene polymer is an ethylene homopolymer having a density in the range of 0.915 to 0.955 g/cm³.

8. The process of claim 7 wherein the homopolymer contains 0.25 to 12 weight percent organically modified clay.

9. The process of claim 1 wherein ethylene is copolymerized with one or more olefinically unsaturated comonomers selected from the group consisting of $C_{3-8}$ α-olefins, vinyl $C_{2-4}$ carboxylates, $C_{1-4}$ alkyl acrylates, and $C_{1-4}$ alkyl methacrylates.

10. The process of claim 9 wherein the ethylene copolymer is an ethylene-vinyl acetate copolymer containing 2 to 48 weight percent vinyl acetate.

11. The process of claim 10 wherein the ethylene-vinyl acetate copolymer contains 0.25 to 12 weight percent organically modified clay.

12. The process of claim 9 wherein the ethylene copolymer is an ethylene-r-butyl acrylate copolymer containing 1 to 48 weight percent n-butyl acrylate.

13. The process of claim 12 wherein the ethylene-n-butyl acrylate copolymer contains 0.25 to 12 weight percent organically modified clay.

14. The process of claim 9 wherein the ethylene copolymer is an ethylene-ethyl acrylate copolymer containing 1 to 48 weight percent ethylene acrylate.

15. The process of claim 14 wherein the ethylene-ethyl acrylate copolymer contains 0.25 to 12 weight percent organically modified clay.

16. The process of claim 1 wherein the organically modified clay is combined with a polar solvent capable of exfoliating the clay prior to addition to the polymerization reactor.

17. The process of claim 16 wherein the polar solvent is toluene.

18. The process of claim 9 wherein the organically modified clay is combined with a polar comonomer prior to addition to the polymerization reactor.

19. The process of claim 18 wherein the polar comonomer is selected from the group consisting of vinyl acetate, ethyl acrylate and n-butyl acrylate.

20. The process of claim 1 wherein all or a portion of the organic peroxide initiator is deposited on the organically modified clay prior to the addition to the polymerization reactor.

* * * * *